UNITED STATES PATENT OFFICE 2,432,007

WOOD IMPREGNATING SOLUTIONS CONTAINING HEAVY METAL COMPOUNDS WITH ARSENIC AND CHROMIC ACIDS

Bror Olof Häger, Stockholm, Sweden, assignor to Bolidens Gruvaktiebolag, Stockholm, Sweden, a joint-stock company of Sweden No Drawing. Application September 4, 1940, Serial No. 355,407. In Sweden October 19, 1939

6 Claims. (Cl. 167—38.5)

The present invention relates to an impregnating solution for preserving wood and other organic materials. The preserving means consists of difficultly soluble arsenates, which by means of a chemical reaction are precipitated in the fibres of the material and are fixed there. The salts of arsenic acid are noted for their good mycocidal properties. Also the heavy metal salts of the arsenic acid are soluble with great difficulty.

The impregnating solution is substantially characterized in that it consists of metallic oxide, metallic hydroxide or metallic carbonate dissolved in an aqueous solution of arsenic acid and chromic acid. The metal compounds that may be used are such ones as form difficultly soluble arsenates with arsenic acid, for instance compounds of zinc (Zn), copper (Cu), cadmium (Cd) and aluminium (Al).

In order to keep the metallic oxide, metallic hydroxide or metallic carbonate in solution the arsenic acid must be present in excess, i. e. in a greater amount than that equivalent to the metal compound. This excess in arsenic acid varies somewhat, depending on the metal present. After the introduction of the impregnating solution into the organic material the chromic acid is reduced with the formation of trivalent positive chromium ions. Chromic acid should be present in the solution to such an amount that the chromium ions will bind the excess of arsenic acid with the formation of difficultly soluble chromium arsenate. As the chromium arsenate precipitates, the excess of arsenic acid is reduced, causing the precipitation of the metal compound that is present in the form of its difficultly soluble arsenate.

As examples the compositions of two impregnating solutions according to the present invention are given below, referring to the introduction of zinc arsenate into the material;

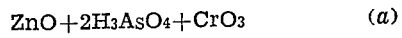

$$ZnO + 2H_3AsO_4 + CrO_3 \quad (a)$$

and

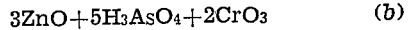

$$3ZnO + 5H_3AsO_4 + 2CrO_3 \quad (b)$$

After the introduction of said solutions into the material there are substantially formed (respectively)

$$ZnHAsO_4 + CrAsO_4 \quad (a)$$

$$3ZnHAsO_4 + 2CrAsO_4 \quad (b)$$

The proportions of the chemicals contained in the impregnating solution according to the present invention may vary considerably. This will be seen also from the above examples. When using the metals zinc (Zn), copper (Cu) and cadmium (Cd) the metal compound may be present in an amount up to 0.6 mol per mol of arsenic acid. In the case of aluminium the most suitable proportions are about 1 mol of aluminium oxide (or 2 mols of aluminium hydroxide, Al/OH/3) to 4 mols of arsenic acid. Greater amounts of metal compounds cannot be used on account of their limited solubility in arsenic acid.

The introduction of the impregnating solution into the material can be carried out in different ways, for instance the immersion process, the sap deplacement method (Boucherie) or the open tank methods, and by means of pressure/or vacuum. In concentrated form the solution may also be introduced by means of the osmose method (diffusion).

Having thus described my invention, I declare that what I claim is:

1. An acidic impregnating solution for preserving wood which comprises an oxide of a heavy metal dissolved in an aqueous solution of arsenic acid and chromic acid, said oxide being one which together with arsenic acid forms difficultly soluble heavy metal arsenate; said solution being substantially free of cations and anions capable of combining to form salts of relatively high solubility in water, whereby upon precipitation of the insoluble impregnating reaction products in said wood, metal salts of relatively high solubility in water are not formed.

2. An acidic impregnating solution for preserving wood as defined in claim 1, wherein the arsenic acid is employed in molecular excess with respect to the heavy metal compound.

3. An acidic impregnating solution for preserving wood as defined in claim 2, wherein the chromic acid is employed in amount sufficient such that the trivalent positive chromium ions formed in the treated wood upon reduction of the chromic acid combine with the excess of arsenic acid to form difficultly soluble chromium arsenate.

4. An acidic impregnating solution for preserving wood which consists of an aqueous mixture of zinc oxide, arsenic acid and chromic acid; said solution being substantially free of cations and anions capable of combining to form salts of relatively high solubility in water, whereby upon precipitation of the insoluble impregnating reaction products in said wood, metal salts of relatively high solubility in water are not formed.

5. An acidic impregnating solution for preserving wood which comprises copper oxide dissolved in an aqueous solution of arsenic acid and chromic acid, characterized in that when the wood is impregnated with the said solution, the compounds formed by the reaction of the solution with the wood are insoluble in water.

6. An acidic impregnating solution for preserving wood which comprises zinc oxide dissolved in an aqueous solution of arsenic acid and chromic acid, characterized in that when the wood is impregnated with the said solution, the compounds formed by the reaction of the solution with the wood are insoluble in water.

BROR OLOF HÄGER.

REFERENCES CITED

The following references are of record in the file of this patent:

UNITED STATES PATENTS

| Number | Name | Date |
| --- | --- | --- |
| 1,957,873 | Wolman | May 8, 1934 |
| 2,041,655 | Gunn | May 19, 1936 |
| 2,012,976 | Schmittutz | Sept. 3, 1935 |
| 2,106,978 | Kamesam | Feb. 1, 1938 |
| 2,139,747 | Hager | Dec. 13, 1938 |
| 2,149,284 | Gordon | Mar. 7, 1939 |
| 2,194,827 | Gordon | Mar. 26, 1940 |

Certificate of Correction

Patent No. 2,432,007.  December 2, 1947.

BROR OLOF HÄGER

It is hereby certified that error appears in the printed specification of the above numbered patent requiring correction as follows: Column 2, line 14, for "pressure/or" read *pressure and/or*; and that the said Letters Patent should be read with this correction therein that the same may conform to the record of the case in the Patent Office.

Signed and sealed this 3rd day of February, A. D. 1948.

[SEAL]

THOMAS F. MURPHY,
*Assistant Commissioner of Patents.*